US006606128B2

(12) United States Patent
Hanafee et al.

(10) Patent No.: US 6,606,128 B2
(45) Date of Patent: Aug. 12, 2003

(54) INTERACTIVE SPECIAL EVENTS VIDEO SIGNAL NAVIGATION SYSTEM

(75) Inventors: Michael Hanafee, Tulsa, OK (US); Connie T. Marshall, Muskogee, OK (US); Timothy S. Emmert, Broken Arrow, OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 10/026,355

(22) Filed: Dec. 21, 2001

(65) Prior Publication Data

US 2002/0095678 A1 Jul. 18, 2002

Related U.S. Application Data

(63) Continuation of application No. 09/330,729, filed on Jun. 11, 1999, now Pat. No. 6,342,926, which is a continuation of application No. 08/561,486, filed on Nov. 20, 1995, now Pat. No. 6,157,413.

(51) Int. Cl.[7] ............................................. H04N 5/445
(52) U.S. Cl. ..................... 348/563; 348/569; 348/461; 725/32; 725/34; 725/35
(58) Field of Search .................................. 348/570, 569, 348/400, 473, 474, 563, 461; 725/33, 1, 32, 34, 35, 36; H04N 5/445

(56) References Cited

U.S. PATENT DOCUMENTS

| 3,729,581 A | 4/1973 | Anderson ................... 178/6.8 |
| 4,058,830 A | 11/1977 | Guinet et al. ................. 358/86 |
| 4,488,179 A | 12/1984 | Krüger et al. .............. 358/181 |

(List continued on next page.)

FOREIGN PATENT DOCUMENTS

| EP | 0 849 948 A2 | 6/1998 | ............ H04N/7/16 |
| EP | 0 852 442 A1 | 7/1998 | ............ H04N/7/16 |
| GB | 1 554 411 | 10/1979 | ............ H04B/3/54 |

OTHER PUBLICATIONS

"Addressable Converters: A New Development at Cable-Data," *Via Cable*, vol. 1, No. 12, Dec. 1981.
"272OR Satellite Receiver User's Guide," General Instrument, 1991, pp. 58–61.

(List continued on next page.)

*Primary Examiner*—Michael H. Lee
(74) *Attorney, Agent, or Firm*—Fish & Neave

(57) ABSTRACT

A system interactively controlled by a TV viewer remote control transmitter displays current or future programming information superimposed over the normal programming displayed on any channel accessible to the viewer's display screen. Identification signal data are accessed and generated by the computer for durations defined in the identification signal data either automatically or in response to the TV viewer remote. Information signal data are accessed and generated by the computer in response to the TV viewer remote. A signal combiner superimposes the identification signal or the information signal over the viewer usable signal of any selected channel from the tuner. The identification signal may include data defining an icon or textual matter alerting a viewer to the availability of information data. The information signal may include program descriptive data, schedule data, pricing data and/or payment authorization and recording prompt data and the like sequenced for interactive control of the computer by the viewer. The identification signal may be specially dedicated to a normal programming information channel so that the viewer can interact with respect to specific programs identified without changing from the programming information channel. Thus, the viewer is able to receive an automatic alert to availability of current and future programming and to elect to interactively exercise a variety of options with respect to such current and future programming without interruption of presently viewed programming.

13 Claims, 6 Drawing Sheets

U.S. PATENT DOCUMENTS

| | | | |
|---|---|---|---|
| 4,685,131 A | 8/1987 | Horne | 380/20 |
| 4,694,490 A | 9/1987 | Harvey et al. | 380/20 |
| 4,706,121 A | 11/1987 | Young | 358/142 |
| 4,751,578 A | 6/1988 | Reiter et al. | 358/183 |
| 4,787,063 A | 11/1988 | Muguet | 364/900 |
| 4,833,710 A | 5/1989 | Hirashima | 380/20 |
| 4,890,321 A | 12/1989 | Seth-Smith et al. | 380/20 |
| 4,963,994 A | 10/1990 | Levine | 358/335 |
| 4,965,825 A | 10/1990 | Harvey et al. | 380/9 |
| 4,977,455 A | 12/1990 | Young | 358/142 |
| 5,003,384 A | 3/1991 | Durden et al. | 358/84 |
| 5,027,400 A | 6/1991 | Baji et al. | 380/20 |
| 5,047,867 A | 9/1991 | Strubbe et al. | 348/564 |
| 5,093,718 A | 3/1992 | Hoarty et al. | 358/84 |
| 5,119,188 A | 6/1992 | McCalley et al. | 358/86 |
| 5,151,782 A | 9/1992 | Ferraro | 358/86 |
| 5,151,789 A | 9/1992 | Young | 358/194.1 |
| 5,172,413 A | 12/1992 | Bradley et al. | 380/20 |
| 5,220,420 A | 6/1993 | Hoarty et al. | 358/86 |
| 5,235,415 A | 8/1993 | Bonicel et al. | 358/84 |
| 5,245,420 A | 9/1993 | Harney et al. | 358/86 |
| 5,253,066 A | 10/1993 | Vogel | 358/188 |
| 5,260,778 A * | 11/1993 | Kauffman et al. | 725/33 |
| 5,311,423 A | 5/1994 | Clark | 364/401 |
| 5,353,121 A | 10/1994 | Young et al. | 348/563 |
| 5,357,276 A | 10/1994 | Banker et al. | 348/7 |
| 5,361,091 A | 11/1994 | Hoarty et al. | 348/7 |
| 5,367,330 A | 11/1994 | Haave et al. | 348/7 |
| 5,404,393 A | 4/1995 | Remillard | 379/96 |
| 5,410,343 A | 4/1995 | Coddington et al. | 348/7 |
| 5,412,720 A | 5/1995 | Hoarty | 380/15 |
| 5,416,508 A | 5/1995 | Sakuma et al. | 348/3 |
| 5,465,385 A | 11/1995 | Ohga et al. | 455/6.1 |
| 5,479,268 A | 12/1995 | Young et al. | 358/335 |
| 5,483,278 A | 1/1996 | Strubbe et al. | 348/7 |
| 5,485,221 A | 1/1996 | Banker et al. | 348/563 |
| 5,495,295 A | 2/1996 | Long | 348/563 |
| 5,526,034 A | 6/1996 | Hoarty et al. | 348/7 |
| 5,532,754 A | 7/1996 | Young et al. | 348/569 |
| 5,537,141 A | 7/1996 | Harper et al. | 348/12 |
| 5,559,549 A | 9/1996 | Hendricks et al. | 348/6 |
| 5,559,550 A | 9/1996 | Mankovitz | 348/6 |
| 5,583,560 A | 12/1996 | Florin et al. | 348/7 |
| 5,585,858 A | 12/1996 | Harper et al. | 348/485 |
| 5,585,866 A | 12/1996 | Miller et al. | 348/731 |
| 5,592,551 A | 1/1997 | Lett et al. | 380/20 |
| 5,594,507 A | 1/1997 | Hoarty | 348/584 |
| 5,600,364 A | 2/1997 | Hendricks et al. | 348/1 |
| 5,600,573 A | 2/1997 | Hendricks et al. | 364/514 |
| 5,648,813 A | 7/1997 | Tanigawa et al. | 348/10 |
| 5,659,350 A | 8/1997 | Hendricks et al. | 348/6 |
| 5,659,366 A | 8/1997 | Kerman | 348/460 |
| 5,682,195 A | 10/1997 | Hendricks et al. | 348/6 |
| 5,724,525 A * | 3/1998 | Beyers et al. | 705/40 |
| 5,734,853 A | 3/1998 | Hendricks et al. | 395/352 |
| 5,781,246 A | 7/1998 | Alten et al. | 348/569 |
| 5,798,785 A | 8/1998 | Hendricks et al. | 348/1 |
| 5,848,352 A | 12/1998 | Dougherty et al. | 455/5.1 |

FOREIGN PATENT DOCUMENTS

| | | | |
|---|---|---|---|
| JP | 60-61935 | 4/1985 | G11B/15/02 |
| WO | WO 93/11640 | 6/1993 | H04N/7/16 |
| WO | WO 94/13107 | 6/1994 | H04N/7/16 |
| WO | WO 94/14281 | 6/1994 | H04N/7/16 |
| WO | WO 94/14282 | 6/1994 | H04N/7/16 |
| WO | WO 94/14283 | 6/1994 | H04N/7/16 |
| WO | WO 94/14284 | 6/1994 | H04N/7/16 |
| WO | WO 95/01058 | 1/1995 | H04N/5/45 |
| WO | WO 95/15649 | 6/1995 | H04N/7/087 |
| WO | WO 95/32583 | 11/1995 | H04N/5/445 |
| WO | WO 95/32585 | 11/1995 | H04N/7/10 |
| WO | WO 96/09721 | 3/1996 | H04N/7/025 |
| WO | WO 96/13935 | 5/1996 | H04N/7/08 |
| WO | WO 96/17473 | 6/1996 | H04N/5/445 |

OTHER PUBLICATIONS

Vito Brugliera, "Digital On–Screen Display—A New Technology for the Consumer Interface," *Symposium Record Cable Sessions*, 18th International Television Symposium and Technical Exhibition, Montreux, Switzerland Jun. 10–15, 1993, Jun. 11, 1993, pp. 572–586.

James Sorce, David Fay, Brian Raila and Robert Virzi, "Designing A Broadband Residential Entertainment Service: A Case Study," GTE Laboratories Incorporated, undated, pp. 141–148.

"A New Approach To Addressability," Cable Data product brochure, undated.

* cited by examiner

INTERACTIVE SPECIAL EVENTS VIDEO SIGNAL NAVIGATION SYSTEM

BACKGROUND OF THE INVENTION

This invention relates generally to interactive video communications and more particularly concerns viewer controlled selection of programming guide information and programming.

Programming guide information is presently displayed to the home TV viewer in non-interactive pages or scrolls of characters conveying programming guide information. Presently known in-home video guide hardware is either attached to or manufactured within a television set and produces interactive program guides that allow users, at their leisure, to peruse program information and make a viewing selection based upon information presented. However, the viewer either has to wait through a scroll of the information, view the information on a page of text, or manually navigate to the information. Unless the viewer manually navigates to event information provided or happens to view the information in a scroll or pages of text, the viewer is unaware of the current and future events that are available.

It is, therefore, an object of this invention to provide a process and in-home video guide hardware by which a home viewer may be informed, in real-time, of events that are available currently or will in the future be available for viewing. Another object of this invention is to provide a process and in-home video guide hardware which alert a viewer to the availability of selected current or future program events. Yet another object of this invention is to provide a process and in-home video guide hardware which permit a viewer to access information about selected programming without changing channels. Another object of this invention is to provide a process and in-home video guide hardware which permit a viewer to interact with information and prompts respecting selected programming without changing channels. A further object of this invention is to provide a process and in-home video guide hardware which ascertain whether an event is current or future. Still another object of this invention is to provide a process and in-home video guide hardware which permit the viewer to choose whether a program will be recorded or not recorded. It is also an object of this invention to provide a process and in-home video guide hardware which permit the viewer to choose whether a program will be recorded with or without copy protection. Yet another object of this invention is to provide a process and in-home video guide hardware which permit the viewer to view a display of the cost of the event. And it is an object of this invention to provide a process and in-home video guide hardware which permit the viewer to authorize payment for access to a selected program.

SUMMARY OF THE INVENTION

In accordance with the invention, a system interactively controlled by a TV viewer remote control transmitter displays current or future programming information superimposed over the normal programming displayed on any channel accessible to the viewer's display screen. A tuner receives TV radio frequency or optical transmission signals in a plurality of cable channels and passes a viewer usable signal of any selected one of the channels to a signal combiner. A computer receives any of a plurality of control signals from the TV viewer remote control transmitter. It also receives from the tuner and stores data contained in a current and future programming identification signal and data contained in a current and future programming information signal. The identification signal contains data indicating the availability of the information signal. The information signal contains data descriptive of and/or facilitating interaction with current and future programming. Portions of the stored identification signal data are accessed and generated as an output identification signal by the computer for durations defined in the identification signal data either automatically at times defined in the identification signal data or in response to a selected one of the plurality of control signals from the TV viewer remote control transmitter. Portions of the stored information signal data are accessed and generated as an output information signal by the computer in response to a selected one of the plurality of control signals from the TV viewer remote control transmitter. The signal combiner superimposes the identification output signal or the information output signal over the viewer usable signal of any selected channel from the tuner to provide a display signal for input to the viewer's display screen. The identification signal may include data defining an icon or textual matter alerting a viewer to the availability of information data or may include data enabling access to such icon or textual matter data as may be already stored elsewhere in the computer. The information signal may include program descriptive data, schedule data, pricing data and/or payment authorization and recording prompt data and the like sequenced for interactive control of the computer by the viewer and may also include data programming the interactive operation of the computer or data initiating operation of an interactive operating program resident in the computer.

In one specially preferred embodiment, the identification signal may be specially dedicated to a normal programming information channel so that the viewer can interact with respect to specific programs identified without changing from the programming information channel. Furthermore, the identification data can be incorporated in the normal programming signal so that no identification signal need be sent to or received from the computer.

Thus, the viewer is able to receive an automatic alert to availability of current and future programming and to elect to interactively exercise a variety of options with respect to such current and future programming without interruption of presently viewed programming.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
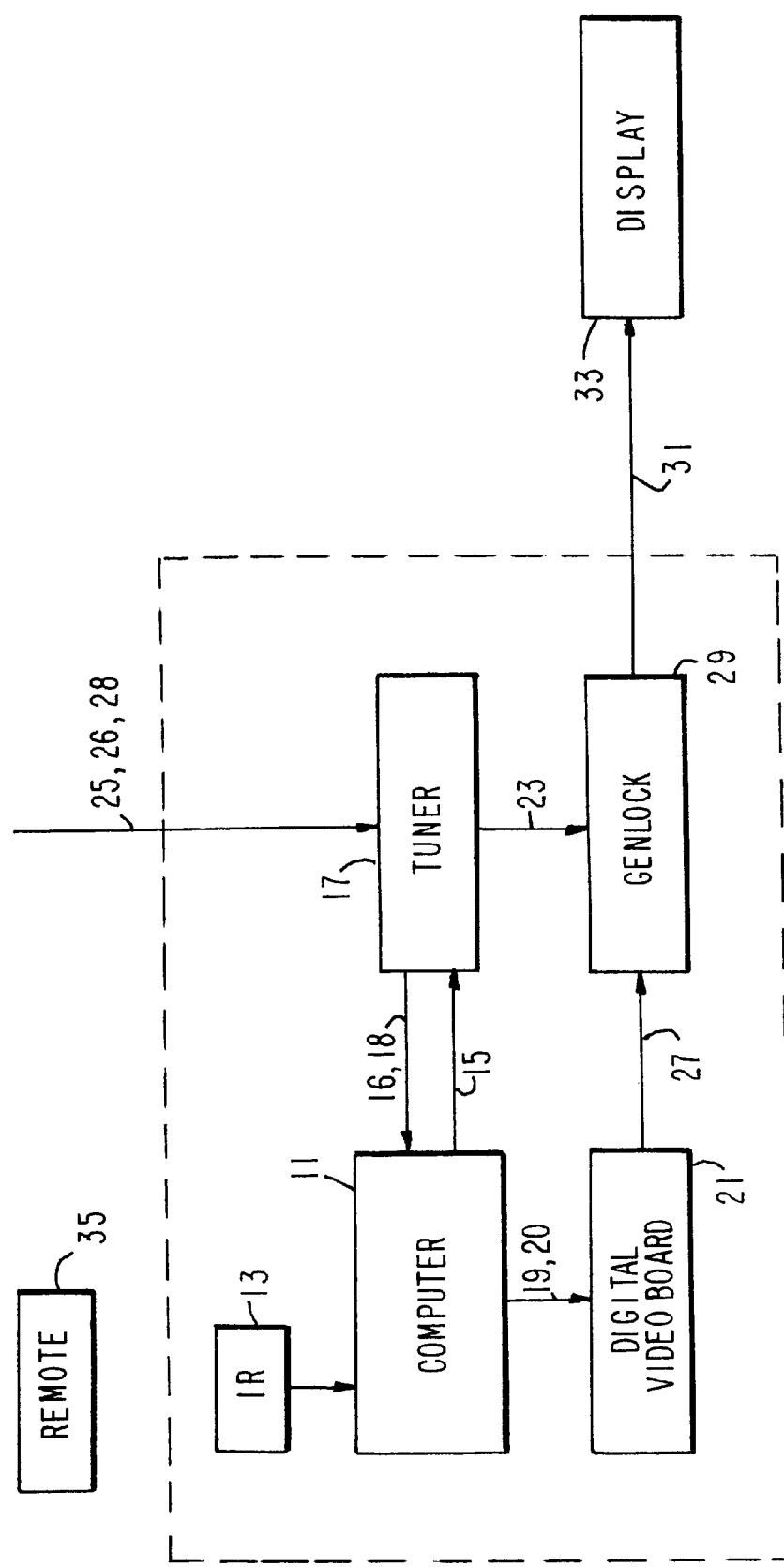
FIG. 1 is a block diagram illustrating a preferred embodiment of the hardware of the interactive special events video signal navigator system.

Turning first to FIG. 1, the components of the interactive special events video signal navigation system are illustrated. A computer 11 having a command information receiver, preferably an infrared or radio frequency receiver 13, provides a control signal 15 to a tuner 17 and a picture image signal 19 or 20 to a digital video board 21. The tuner 17 converts or demodulates radio frequencies or optical transmissions to a signal usable by the viewer to output a normal programming signal 23 selected from a plurality of normal programming signals 25 input to the tuner 17 from the cable source (not shown), typically frequency division multiplexed video, audio and data signals transmitted via a coaxial cable, over-the-air radio frequencies or fiber optics. The tuner 17 also receives current and future programming identification and/or information signals 26 and 28 from the cable source (not shown) and feeds corresponding current and future programming identification and/or information signals 16 and 18 for storage in the computer 11. The identification signals 16 contain data relative to the availability of information signals 18 and the information signals 18 contain data descriptive of and/or facilitating interaction by the viewer with options relating to current and future programming. The computer 11 automatically accesses selected portions of the data stored from the output identification signal 16 at times and for durations defined in that data and generates a corresponding picture image signal 19. The computer 11 also accesses selected portions of the data stored from the output information signal 18 in response to a selected one of the plurality of control signals from the TV viewer remote control transmitter 13 to the computer 11 and generates a picture image signal 20. The digital video board 21 receives the picture image signal 19 or 20 from the computer 11 and converts the digital data into a video signal 27. The tuner output or base programming signal 23 has superimposed thereon in a genlock signal combiner or overlayer 29 the video image signal 27 from the digital video board 21. The combined signal 31 is then displayed on a video signal display device such as the display screen 33 of the viewer's television. The viewer sends commands to the receiver 13 to control the operation of the computer 11 by the use of a remote control transmitter, preferably an infrared or radio frequency transmitter 35. The computer 11 is based on a microprocessor and may utilize random access (RAM) and/or read only (ROM) memory. The software necessary to operate the microprocessor may be embedded in the device or, as explained above, downloaded via the cable system (not shown) through the tuner 17 to the computer 11. The identification and information signals 26 and 28 to the tuner 17 and corresponding signals 16 and 18 to the computer 11 may be transmitted in single or separate packages.

Figure 2:
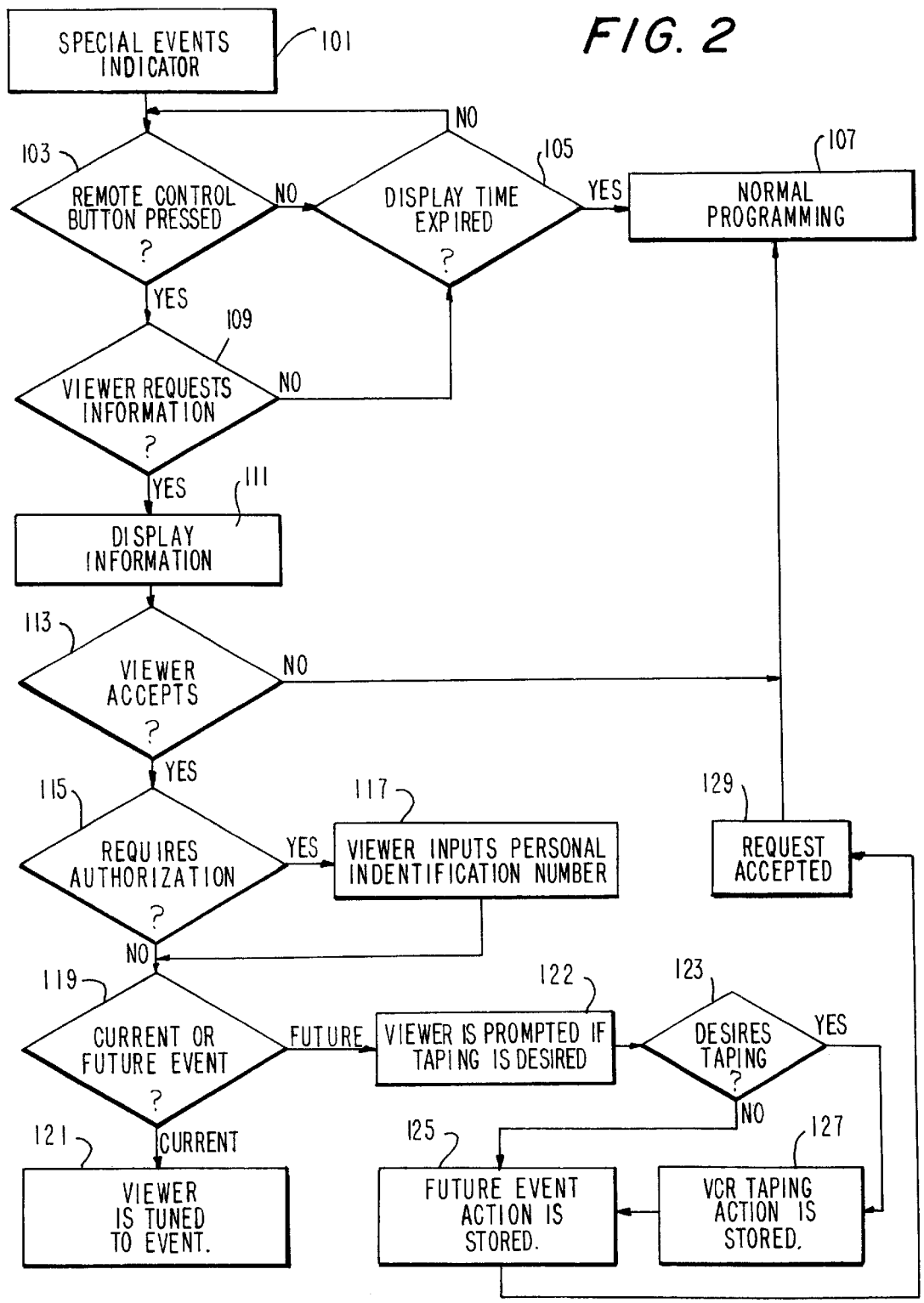
FIG. 2 is a flow chart illustrating a preferred sequence of process steps and options of the interactive special events video signal navigator system.
Figure 3:
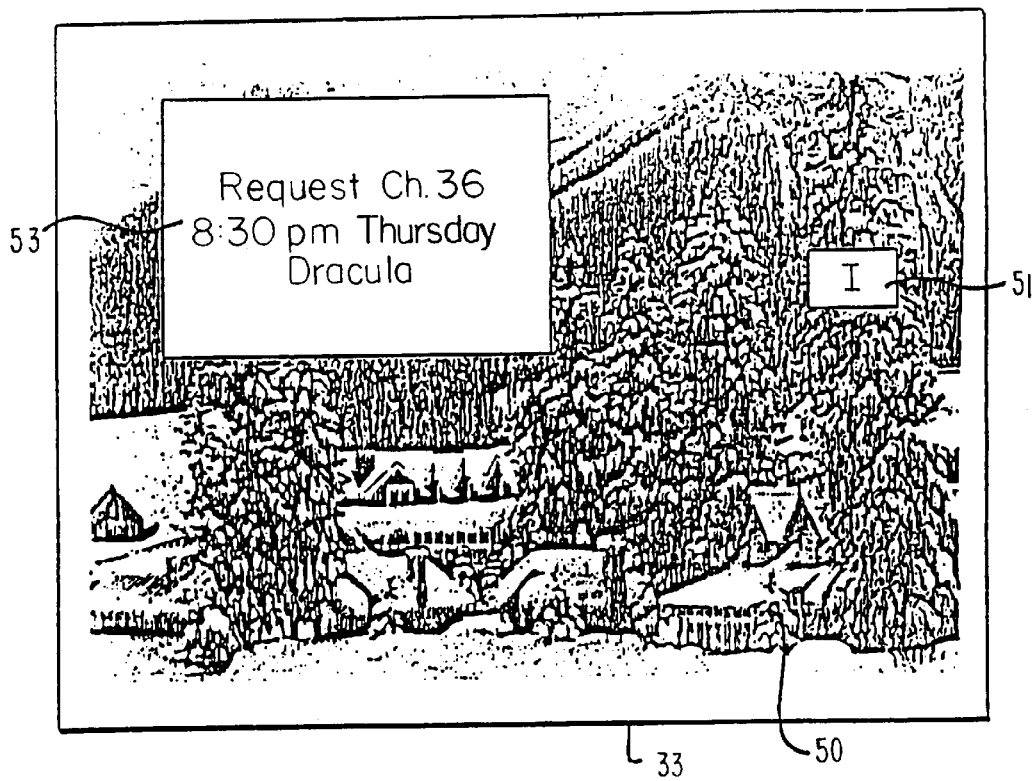
FIG. 3 is a representation of a video screen display of a typical special events output identification signal superimposed over a normal programming signal.
Figure 4:
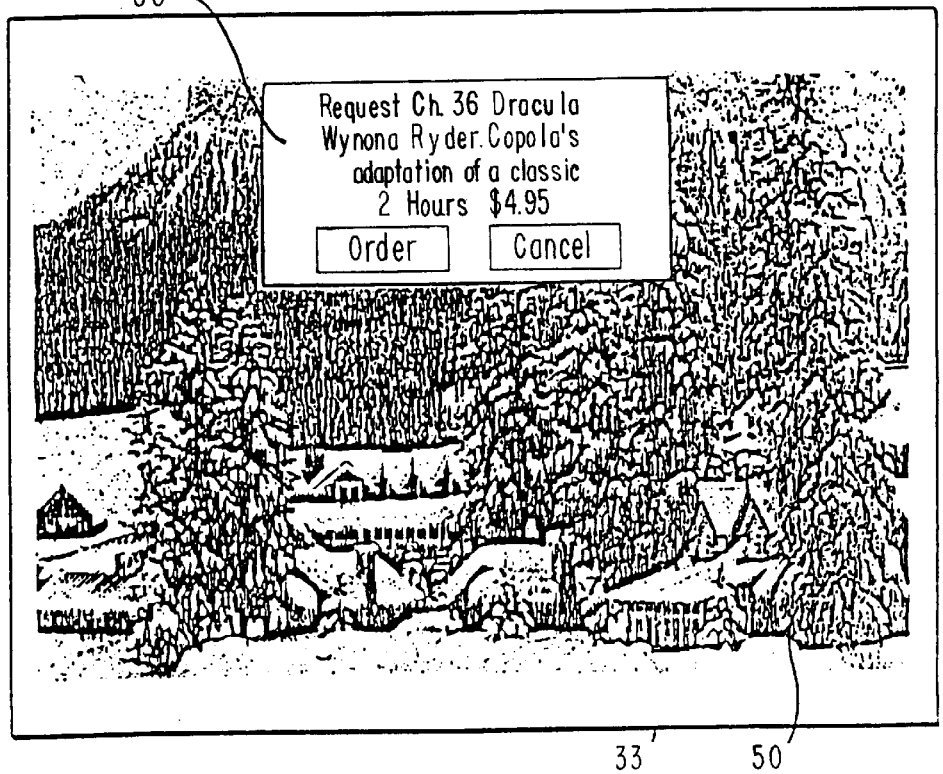
FIG. 4 is a representation of a video screen display of a typical special events output information signal containing program description data superimposed over a normal programming signal.
Figure 5:
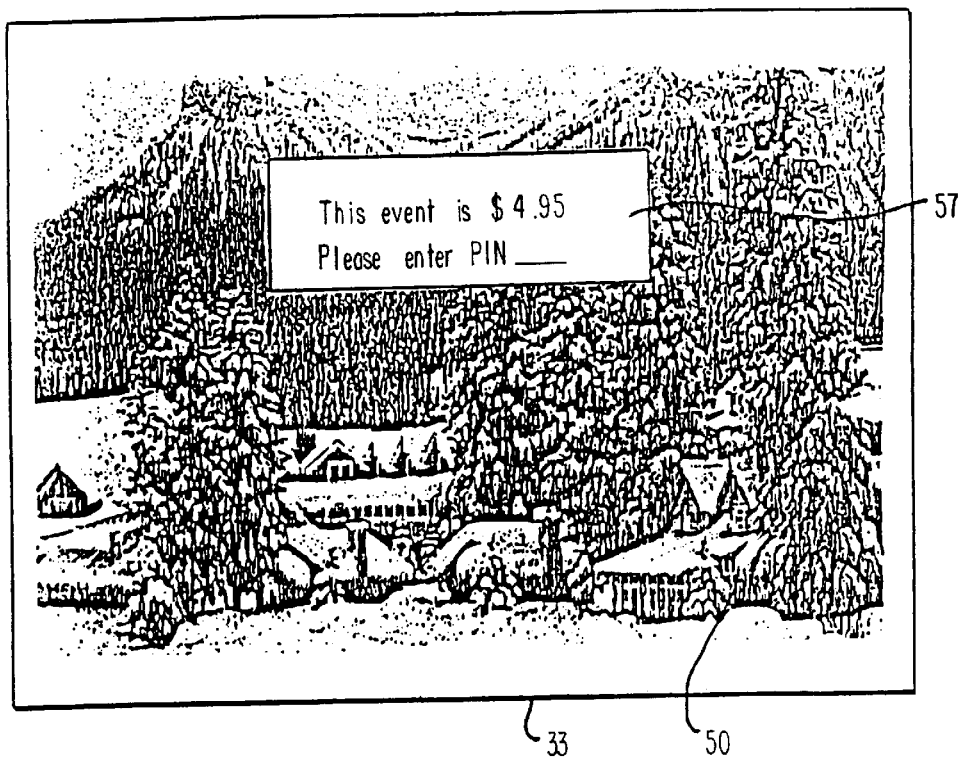
FIG. 5 is a representation of a video screen display of a typical special events output information signal containing price information and authorization option data for interaction by the viewer superimposed over a normal programming signal.
Figure 6:
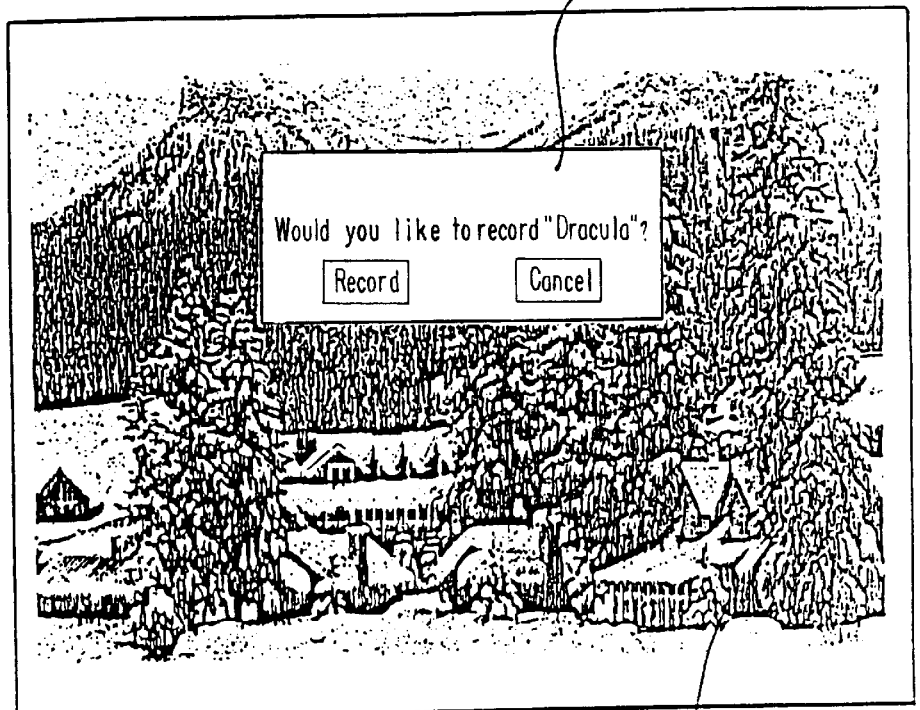
FIG. 6 is a representation of a video screen display of a typical special events output information signal containing "record" option data for interaction by the viewer superimposed over a normal programming signal.
Figure 7:
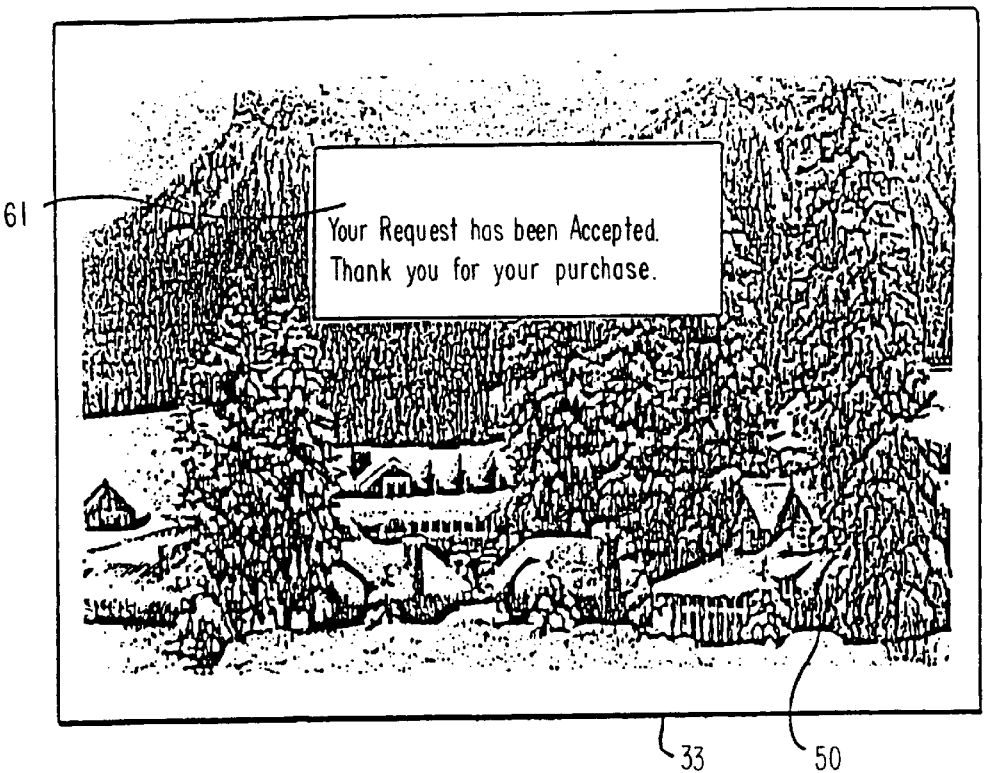
FIG. 7 is a representation of a video screen display of a typical special events output information signal containing data confirming interaction to the viewer superimposed over a normal programming signal.
Figure 8:
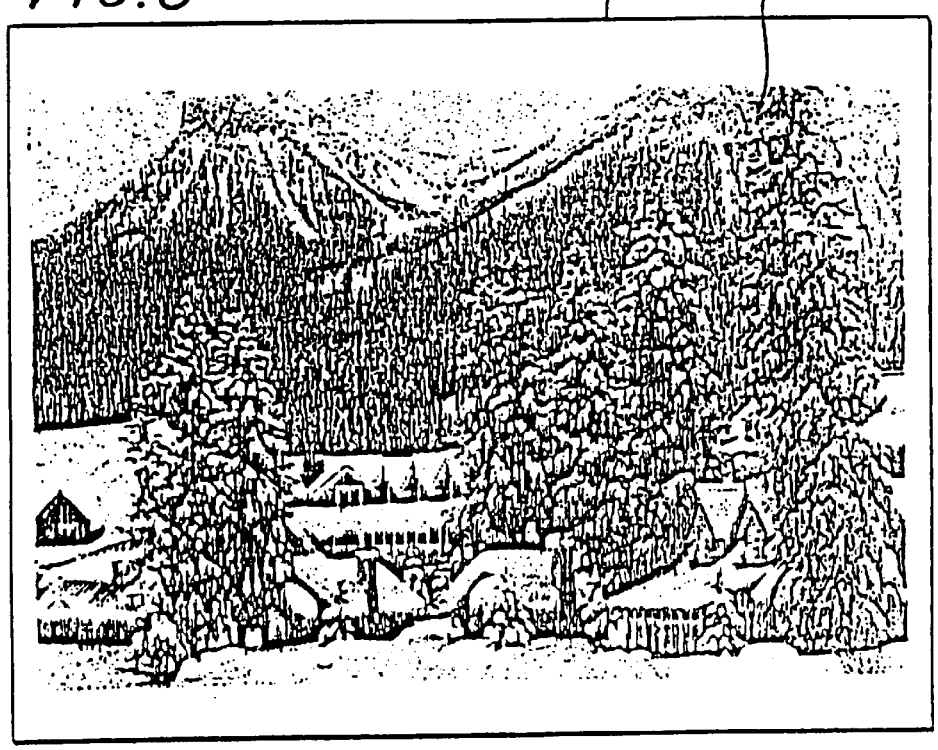
FIG. 8 is a representation of a video screen display of a normal programming signal without superimposition of a special events output identification or information signal.

The above-described interactive special events video signal navigation system components operate in response to the control of the computer 11. As shown in FIG. 2, while the home viewer is watching programming presented on his display 33 in response to the tuner 17 feeding any basic program signal 23 from the input selections 25 to the genlock combiner 29, the computer 11 may be automatically prompted by data received in an identification signal 16 to cause a "special event" indicator to appear on the viewer's display 33. Looking at FIG. 3, the special event indicator 101 may appear as an icon 51 or as textual material 53 or a combination of icon 51 and textual information 53 in the viewer's display 33 superimposed over normal programming 50. When the icon 51 and/or textual material 53 appear, the system proceeds to a "remote control button pressed?" inquiry 103 and determines whether the viewer has responded to the presence of the special event indicator 101 by pressing a button on the remote control 35. If the viewer has not pressed a button on the remote control 35, then the program proceeds to a "display time expired?" option 105. At this step the system inquires as to whether the special events indicator 101 has been displayed for a minimum time period established by data in the identification signal 16. If the answer to this inquiry is "YES," then the special events indicator 101 will be removed at step 107 and the viewer's display 33 will return to the normal programming 50 only, as is illustrated in FIG. 8. If the answer to the "delay time expires?" inquiry 105 is "NO," the program is rerouted through the "remote control button pressed?" inquiry 103. If the response to the "remote control button pressed?" inquiry 103 is "YES," the system next proceeds to a "viewer request information?" inquiry 109 at which it is determined whether the viewer has pressed a remote control button indicative of a desire to obtain further information regarding the event related to the special event indicator 101. If the answer to this inquiry is "NO," then the system proceeds again to the "display time expired?" inquiry 105 for further processing as hereinbefore explained. If the answer to the "viewer request information?" inquiry 109 is "YES," then the system proceeds to a "display information" condition 111. In this condition, the viewer display 33 includes a display of program information 55 superimposed on the normal programming 50. As shown, the information 55 includes a prompt to the viewer asking whether the viewer wishes to order the special event described in the information or wishes to cancel the operation of the system. With this prompt displayed, the system proceeds to a "viewer accepts?" option 113 in which the viewer can choose to "order" or "cancel." If, by use of the remote control 35, the response to the "viewer accepts?" inquiry 113 is "NO," then the system is directed to the normal programming step 107 in which only normal programming 50 appears on the viewer's display 33. If, in response to the "viewer accepts?" inquiry 113, the viewer indicates "YES" by operation of an appropriate button on the remote control 35, then the program proceeds to a "requires authorization?" inquiry 115. If the event is a pay-per-view event, information relevant to pricing and authorization will have been included in the data forming the information signal 16 fed to the computer 11. If the answer to the "requires authorization?" inquiry 115 is "YES," then the viewer display 33 will include the normal programming 50 with the pay-per-view information 57 superimposed thereon, as is illustrated in FIG. 5. As shown, that pay-per-view information 57 may include an opportunity for the viewer to enter a PIN number by use of the remote control 35 at a "viewer input personal identification number" step 117 of the process. If the answer to the "requires authorization?" inquiry 115 is "NO" or if the viewer inputs a personal identification number at step 117, the system proceeds to a "current or future event?" inquiry 119. If data stored in the computer indicates that the answer to this inquiry 119 is "current," then the system proceeds to a "viewer is tuned to event" step 121 in which only the event identified by the original special events indicator 101 will appear on the viewer's display 33. If the response to the "current or future event?" inquiry 119 is "future," then the system proceeds to a display of information step 122 in which a prompt 59 inquires to whether taping is desired, as is shown in FIG. 6. The system then proceeds to a "desires taping?"
inquiry 123. If the viewer's response to the "desires taping?" inquiry 123 via the remote 35 is "NO," then the system proceeds to a "future event action is stored" step 125 in which the system will automatically display the selected event at its scheduled time. If the response to the "desires taping?" inquiry 123 via the remote 35 is "YES," then the system proceeds to a "VCR taping action is stored" step 127 from which the system will further proceed to the "future event action is stored" step 125 and taping of the selected event will also be automatically initiated at the scheduled time of the event. After the "future event action is stored" step 125, the system proceeds to a request accepted step 129 in which confirmation information 61 is superimposed over the normal programming 50 on the viewer's display 33 as shown in FIG. 7 to acknowledge that the viewer's commands have been entered into the system. After a predetermined lapse of time, the system continues to a normal programming step 107 at which normal programming 50 is continued as illustrated in FIG. 8 until such time as the action indicated by the viewer is taken by the system.

Figure 9:
FIG. 9 is a representation of a video screen display of a typical special events output identification signal superimposed over a normal programming signal of a program information channel.

Turning to FIG. 9, the application of the navigation system to a programming information channel is illustrated. The identification signal 19 passed by the computer 11 for superimposition over the normal programming 23 causes the textual material 63 to be superimposed over the normal programming 50 on the viewer's display 33. In the alternative, in the programming information channel application, the use of an identification signal 16, 19 or 26 can be omitted all together and the viewer made aware of the existence of the information signal 18, 20 or 28 merely by use of an icon or by the physical positioning of the text 63 in the display of the normal programming 50. That is, the icon or textual material 63 is transmitted as part of the normal programming 50 for the programming information channel. When an icon appears on the display or textual matter 63 is displayed in a particular physical location on the display 33, the viewer is automatically alerted to the possible existence of an information signal 20 in the computer 11 and, by operation of the remote 35, can immediately cause the superimposition of the information signal 20 over the normal programming signal 23.

It is further contemplated that the icon 51 employed in the navigation system may be specifically correlated to the nature of the special event identified. For example, icons configured as a projector might indicate a movie event, as a tornado might indicate a weather event, as a guitar might indicate a musical event, as an open newspaper might indicate a news event, as a football helmet might indicate a sporting event and so on.

Thus, it is apparent that there has been provided, in accordance with the invention, an interactive special events video signal navigation system that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method for accessing a television event, comprising:

automatically displaying an indicator, that is based on a broadcast television signal that indicates the availability of the television event, with a first television program displayed on a television;

receiving a first user input in response to the indicator displayed;

displaying information relating to the television event upon receipt of the first user input;

receiving a second user input in response to the information displayed;

and providing an option for accessing the television event if the television event is a future event.

2. The method of claim 1, wherein the option for accessing the television event comprises:

displaying on the television a prompt that inquires whether the television event is to be recorded;

receiving a third user input in response to the prompt; and designating the television event as to be recorded in response to receipt of the third user input.

3. The method of claim 1, wherein the option for accessing the television event comprises:

displaying on the television a prompt that inquires whether the television event is to be ordered;

receiving a third user input in response to the prompt; and ordering the television event in response to receipt of the third user input.

4. The method of claim 1, wherein the option for accessing the television event comprises:

displaying on the television a second prompt that requests authorization to order the television event;

receiving a fourth user input in response to the second prompt; and preventing the ordering of the television event when the fourth user input is insufficient to authorize ordering of the television event.

5. The method of claim 1, wherein the indicator is an icon.

6. The method of claim 1, wherein the indicator is text.

7. The method of claim 1, wherein the indicator is indicative of content of the television event.

8. The method of claim 1, wherein the information includes a cost associated with the television event.

9. The method of claim 1, wherein the information includes a start time for the television event.

10. The method of claim 1, wherein the information includes a title for the television event.

11. The method of claim 1, wherein the information includes a television channel associated with the television event.

12. The method of claim 1, wherein the information includes a name of a person associated with the television event.

13. The method of claim 1, wherein the information includes an indication of the length of the television event.

* * * * *